(12) United States Patent
Breuer et al.

(10) Patent No.: US 12,394,870 B2
(45) Date of Patent: Aug. 19, 2025

(54) CONNECTING A CELL STACK TO AT LEAST ONE CONTACT ELEMENT IN A VACUUM USING A LASER

(71) Applicant: VOLKSWAGEN AKTIENGESELLSCHAFT, Wolfsburg (DE)

(72) Inventors: Alexander Breuer, Celle (DE); Dennis Böhm, Wolfenbüttel (DE); Frederik Grau, Braunschweig (DE); Markus Ramm, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 446 days.

(21) Appl. No.: 17/800,497

(22) PCT Filed: Jan. 29, 2021

(86) PCT No.: PCT/EP2021/052090
§ 371 (c)(1),
(2) Date: Aug. 17, 2022

(87) PCT Pub. No.: WO2021/152080
PCT Pub. Date: Aug. 5, 2021

(65) Prior Publication Data
US 2023/0078332 A1    Mar. 16, 2023

(30) Foreign Application Priority Data
Jan. 30, 2020 (DE) ............... 10 2020 102 317.0

(51) Int. Cl.
| H01M 50/536 | (2021.01) |
| B23K 26/26 | (2014.01) |
| H01M 10/0525 | (2010.01) |
| H01M 10/058 | (2010.01) |

(52) U.S. Cl.
CPC ........... *H01M 50/536* (2021.01); *B23K 26/26* (2013.01); *H01M 10/0525* (2013.01); *H01M 10/058* (2013.01); *H01M 2220/20* (2013.01)

(58) Field of Classification Search
None
See application file for complete search history.

(56) References Cited

U.S. PATENT DOCUMENTS

| 3,860,784 | A | * | 1/1975 | Brown | ............... | B23K 26/0643 |
| | | | | | | 219/121.84 |
| 5,096,518 | A | | 3/1992 | Takao et al. | | |
| 6,156,452 | A | * | 12/2000 | Kozuki | ............... | H01M 50/559 |
| | | | | | | 429/211 |
| 9,375,804 | B2 | | 6/2016 | Lev | | |
| 9,882,193 | B2 | * | 1/2018 | Choi | ............... | B23K 20/129 |
| 10,919,112 | B2 | | 2/2021 | Dai et al. | | |
| 10,944,096 | B2 | | 3/2021 | Dai et al. | | |
| 11,710,879 | B2 | * | 7/2023 | Chen | ............... | B23K 26/323 |
| | | | | | | 228/110.1 |
| 2003/0035993 | A1 | | 2/2003 | Enomoto et al. | | |
| 2012/0276435 | A1 | * | 11/2012 | Hallmark | ......... | H01M 10/0585 |
| | | | | | | 429/131 |
| 2013/0029206 | A1 | * | 1/2013 | Lev | ............... | H01M 50/522 |
| | | | | | | 429/161 |
| 2020/0067065 | A1 | * | 2/2020 | Breuer | ............... | H01M 50/54 |
| 2021/0280841 | A1 | * | 9/2021 | Aizawa | ............... | H01M 50/538 |
| 2022/0320478 | A1 | * | 10/2022 | Böhm | ............... | H01M 50/54 |

FOREIGN PATENT DOCUMENTS

| CN | 102896416 A | 1/2013 |
| CN | 105269152 A | 1/2016 |
| CN | 109483055 A | 3/2019 |
| CN | 110364678 A | 10/2019 |
| CN | 110421268 A | 11/2019 |
| DE | 40 05 674 A1 | 8/1990 |
| DE | 10 2009 035 496 | 2/2011 |
| DE | 10 2011 107 708 A1 | 1/2013 |
| DE | 10 2012 213 110 A1 | 1/2014 |
| DE | 10 2015 118 486 A1 | 5/2017 |
| DE | 10 2016 225 175 A1 | 6/2018 |
| DE | 10 2019 108 876 | 10/2019 |
| DE | 10 2019 110 375 | 10/2019 |
| DE | 10 2019 102 233 | 6/2020 |

(Continued)

OTHER PUBLICATIONS

Jiang et al. NPL (Appl. Sci., vol. 7, 2017, p. 909 (17 pages)) (Year: 2017).*
Search Report for International Application No. PCT/EP2021/052090, mailed on Apr. 14, 2021.
Search Report for German Patent Application No. 10 2020 102 317.0, mailed Sep. 14, 2020.

(Continued)

*Primary Examiner* — Kevin M Bernatz
(74) *Attorney, Agent, or Firm* — PEARL COHEN ZEDEK LATZER BARATZ LLP

(57) ABSTRACT

A method for producing a component for storing electrical energy, said component comprising at least one cell stack for storing electrical energy and at least one contact element for making electrical contact with the at least one cell stack, has at least the following steps: a) arranging at least part of the at least one cell stack and the at least one contact element in a defined arrangement relative to one other in, or against a chamber that can be evacuated; b) evacuating at least some of the gas in the chamber; c) connecting the at least one cell stack and the at least one contact element together to form an electrically conductive connection by means of at least one laser beam introduced into the chamber.

8 Claims, 5 Drawing Sheets

(56) References Cited

FOREIGN PATENT DOCUMENTS

| EP | 2 518 812 A2 | 10/2012 |
|---|---|---|
| JP | 2016-120506 A | 7/2016 |
| WO | WO 2009153962 A1 | 12/2009 |

OTHER PUBLICATIONS

Search Report for Chinese Patent Application No. 202180011756.4, dated Feb. 18, 2025.

* cited by examiner

US 12,394,870 B2

CONNECTING A CELL STACK TO AT LEAST ONE CONTACT ELEMENT IN A VACUUM USING A LASER

CROSS-REFERENCE TO RELATED APPLICATIONS

This application is a National Phase Application of PCT International Application No. PCT/EP2021/052090, International Filing Date Jan. 29, 2021, claiming priority of German Patent Application No. 10 2020 102 317.0, filed Jan. 30, 2020, which is hereby incorporated by reference.

The invention relates to a method for producing a component (for example, for a (Li-ion battery cell) for storing electrical energy, said component comprising at least one cell stack for storing electrical energy and at least one contact element for making electrical contact with the at least one cell stack, it also relates to such a component as well as to a device for producing such a component. The invention is especially used for producing lithium-ion batteries, for example, for electrified vehicles.

BACKGROUND OF THE INVENTION

German patent application DE 10 2012 213 110 A1 discloses a method for producing lithium-ion cell modules using process-integrated frame production. In this context, connection lugs of one polarity that have already been connected to a cell stack in order to form a contact area are flanged and subsequently welded. That document advises against additional contact means.

German patent application DE 10 2016 225 175 A1 discloses an enclosure for a battery module. Here, electrodes of cell stacks that are adjacent to each other are welded together in order to connect the adjacent cell stacks to each other, thereby forming a module.

European patent application EP 2 518 812 A2 discloses a method for forming an encapsulated solid electrochemical component. Here, layers that are arranged on a vacuum plate are welded to each other by means of a laser along a circumference and cut to size.

German patent application DE 40 05 674 A1 discloses a method and a device for encapsulating a material that is to be processed by hot or warm isostatic pressing, such as, for example, sintered material.

Furthermore, special devices are known in which welding under a vacuum or negative pressure is possible. Owing to the vacuum in these devices, welding spatter and weld seam imperfections can be advantageously minimized. However, until now, these devices have usually been used only for steel welding operations. For one thing, a drawback of the known negative pressure/vacuum steel welding devices is that they can often only create rotary weld seams. Another drawback is that, as a rule, the known devices have to be able to weld components of various dimensions so that the volume that has to be evacuated is over-dimensioned for many of the components, as a result of which the evacuation time is unnecessarily prolonged when it comes to small components.

SUMMARY OF THE INVENTION

Before this backdrop, one objective of the invention is to at least partially overcome the problems described in conjunction with the state of the art. In particular, a method for producing a component, as well as a component and a device for producing a component are to be put forward, all of which can especially at least contribute to saving time and/or costs during the production of (lithium-ion) batteries.

These objectives are achieved by the features of the independent patent claims. Additional advantageous embodiments of the solution being put forward here are presented in the dependent patent claims. It should be pointed out that the features presented individually in the dependent patent claims can be combined with each other in any desired technically meaningful manner and they define additional embodiments of the invention. Moreover, the features presented in the patent claims are expressed more precisely and explained in the description, whereby additional preferred embodiments of the invention are presented.

Contributing to this objective is a method for producing a component for storing electrical energy, said component comprising at least one cell stack for storing electrical energy and at least one contact element for making electrical contact with the at least one cell stack, the method comprising at least the following steps:

a) arranging at least part of the at least one cell stack and the at least one contact element in a defined arrangement relative to one another in or against a chamber that can be evacuated;
b) evacuating at least some of the gas in the chamber;
c) connecting the at least one cell stack and the at least one contact element together to form an electrically conductive connection by means of a laser beam introduced into the chamber.

Steps a), b) and c) can be carried out at least once in the given sequence. Furthermore, at least steps a) and b) or else b) and c) can also take place—at least partially—in parallel. The method can be carried out, for example, using a device that is being described here. The method is especially used to connect a cell stack to at least one contact element (e.g. a so-called "arrester") in a vacuum using a laser. Welding the so-called arresters onto a cell stack (for a Li-ion cell) under a negative pressure or under a vacuum using a laser is a particularly advantageous aspect of the method. The combination of laser welding with the negative pressure or vacuum conditions can yield especially the advantages that—at the same laser power—the welding penetration depth/through-welding depth can be increased under a negative pressure or under a vacuum (as the negative pressure rises), and/or—at the same welding penetration depth/through-welding depth—less laser power can be used under a negative pressure or under a vacuum (as the negative pressure rises). Therefore, the method can advantageously contribute at least to saving time and/or costs and/or to the welding of thicker components during the production of lithium-ion batteries.

The component is suitable for storing electrical energy. The component can be, for example, a component for a (rechargeable) lithium-ion battery. In this context, the component can comprise, for example, a part for a (lithium-ion) cell. The component comprises at least one cell stack for storing electrical energy and at least one contact element for making electrical contact with the at least one cell stack. As a rule, after the cell stack and the contact element have been connected, several components thus produced can be joined to form a cell. The component can comprise a single cell stack. Moreover, the component can comprise (exactly) two contact elements. As a rule, the method serves to electrically conductively connect the at least one or two contact elements to the cell stack (a single one in each case), so that the at least one cell stack can be connected to an electric circuit via the contact element. The contact elements can form, for example, electric connections of the component or electric connecting elements of the component in order to connect the component to component-external parts or additional components. The contact element can be connected (directly) to an (electrode) lug of the cell stack. As a rule, there are at least two contact elements that are (directly) connected to (heteropolar electrode) lugs of the cell stack.

Step a) involves arranging at least part of the at least one cell stack and the at least one contact element in a defined arrangement relative to one another in or against a chamber that can be evacuated. Especially (for this purpose), Step a) can involve providing the at least one cell stack and the at least one contact element in a defined arrangement relative to one another in a chamber that can be evacuated. The terms arranging or providing in the evacuable chamber especially means that the at least one cell stack and the at least one contact element are arranged (completely) inside a space that is delimited by the chamber's inner walls (which usually delimit six sides). An arrangement on the evacuable chamber can be configured, for example, in such a way that the chamber is (systematically) arranged, for instance, like a bell over the area in which the connection between the cell stack and the contact element is to be made. In this context, at least part of the at least one cell stack and the at least one contact element can form one of the chamber walls. As a rule, the chamber is a negative pressure/vacuum chamber. The chamber can be divided into a lower section and a cover. The cover can be removed in order to put cell stack(s) and the contact element(s) in place. As a rule, the cover is once again connected (gas-tight) to the lower section before the laser beam is introduced. Such a gas-tight connection can be interrupted locally, for example, in one or two places along the circumference of the chamber, by negative pressure connection ports through which the gas can be evacuated from the chamber (with the cover closed).

The defined relative arrangement can be, for example, such that a contact element overlaps with at least one (electrode) lug of the at least one cell stack. In the interior of the chamber, the arrangement of the component that is to be welded can be, for instance, such that a contact element overlaps with at least one lug or with the (homopolar) lugs of at least one cell stack. In particular, the defined relative arrangement can be configured in such a way that a contact element is positioned below or above one lug or several (homopolar) lugs of a cell stack. The (laser-welded) connection can be made in the appertaining overlapping area. In other words, this especially means that a weld seam can be formed in the overlapping area. The "lug" is usually a part of the cell stack that projects from one side of the cell stack for connection purposes. The weld seam can be configured as a fillet weld or as a square butt weld. Moreover, the "lugs" and the arresters can be arranged as a butt joint. The person skilled in the art normally also refers to the contact elements as so-called "arresters". In particular, at least one laser weld seam is created with which adhesive force directly connects an arrester to at least one (electrode) lug or to several (homopolar) lugs of a cell stack.

Step b) involves evacuating at least some of the gas in the chamber. The chamber can be evacuated until a predefined (negative) pressure or vacuum is present in the chamber. The chamber can be evacuated uniformly throughout its entire interior volume. As an alternative, it can be provided that the evacuation is systematically carried out in the area or areas of the chamber where the connection between the at least one cell stack and the at least one contact element is to be made. For purposes of evacuation, for example, gas can be pumped out of the chamber. Vacuum pumps can be used for this purpose in a fundamentally known manner.

Step c) involves connecting the at least one cell stack and the at least one contact element together to form an electrically conductive connection by means of a laser beam introduced into the chamber. This especially relates to an internal welding between at least one (electrode) lug of the cell stack and at least one arrester. This can be distinguished, for example, from external cell welding which, as a rule, relates to the contacting of the finished cells with each other in a module and in which the cell arresters that project from the appertaining cell are usually connected to other cell arresters via a bus bar or a bus connection. In particular, in Step c), at least one laser-welded connection is made between at least one contact element and at least one cell stack. For example, a weld seam formed in this process can be rectilinear and/or can run in a plane. For example, in each case, one weld seam can be used to connect a contact element to one or to the (homopolar) lug of a cell stack. In this context, the number of weld seams can match the number of contact elements.

The connection is especially made by means of a laser device that is suited for welding aluminum-aluminum and/or copper-copper connections. For example, the laser device can be provided and configured to connect a material containing (predominantly) aluminum (for example, of a contact element) to a material containing (predominantly) aluminum (for example, of a lug) and/or a material containing (predominantly) copper (for example, of a contact element) to a material containing (predominantly) copper (for example, of a lug). For instance, on the anode side, anode lugs containing predominantly copper can be connected to an anode arrester containing predominantly copper. Furthermore, by way of example, on the cathode side, cathode lugs containing predominantly aluminum can be connected to a cathode arrester containing predominantly aluminum. Such material combinations can be present especially in lithium-ion batteries. In the method being described here, an advantage of the negative pressure or vacuum can be that one can use one or more lasers for a specific wavelength range (that might not be ideal for both of the materials—aluminum and copper) to carry out advantageous welding operations in both materials.

According to an advantageous embodiment, it is being proposed for the at least one cell stack to be a cell stack for a lithium-ion cell. Such cells can be used advantageously in the realm of electrified vehicles.

According to another advantageous embodiment, it is being proposed that the chamber is configured to be dimension-specific for a given component. This can also be described in other words such that the chamber (for example, its inner volume and/or its inner contour) is adapted to the dimensions of a certain type or a certain kind of component (for example, characterized by at least its volume and/or its outer contour). In particular, the chamber can be used exclusively for a certain type or certain kind of component such as, for instance, a cell stack (with possible product carrier) of a given size. For example, the inner volume of the chamber (in the loaded state) can be filled up to at least 60%, preferably at least 70% and especially preferably at least 80%, with the component. This advantageously means that the unusable "dead spaces" of the chamber remain as small as possible. advantages that ensue from this are, among other things, that the sealing of the two parts that are to be joined to each other (for example, the chamber base and the cover) and/or to the components that form the negative pressure can be simplified, and/or the evacuation or venting times before a requisite negative pressure has been established can be greatly reduced, and/or the cleaning work needed because of the depositing of welding smoke, welding dust, welding spatter can be facilitated. The smallest possible dead spaces advantageously mean that the chamber can be evacuated—also within the short duration that suffices for modern production processes—to such an extent (or to such a low negative pressure) that sufficient welding depths can be achieved with a relatively low laser power.

According to another advantageous embodiment, it is being proposed for the at least one laser beam to be an infrared laser beam. Advantages of such IR lasers are especially that they are substantially less expensive than the currently available laser systems in the green or blue wavelength range, and also that the efficiency and/or the available powers of the IR laser sources are better. Particularly when materials containing aluminum and copper are being welded using an IR laser without reducing the pressure in the area of the welding site, it is a drawback that a great deal of spatter and many discontinuities are observed in the weld seam. Owing to the vacuum that could be achieved very simply or owing to the low negative pressure that could be achieved very simply, it was possible to minimize the weld spatter and weld seam imperfections.

According to another advantageous embodiment, it is being proposed that the at least one laser beam enters the chamber through the at least one laser beam entry window. For example, the number of laser beam entry windows matches the number of weld seams that are to be created and/or the number of laser devices that are present. The at least one laser beam entry window can be inserted into an (upper) chamber wall and/or into a cover of the chamber. The at least one laser beam entry window also advantageously contributes to the reduction of the dead spaces since, as a result, the laser source can be arranged outside of the chamber.

According to another advantageous embodiment, it is being proposed that at least two contact elements are connected to a cell stack by means of laser beams that, at least at times, are functioning in parallel or simultaneously. In this context, for example, at least two laser devices and, optionally, two laser beam entry windows can be provided. This can contribute to the fact that at least two weld seams of the component can be created at least sometimes in parallel or simultaneously, which can advantageously contribute to reducing the production time.

According to another (alternative) advantageous embodiment, it is being proposed that at least two contact elements are connected to a cell stack by means of laser beams that function consecutively in time. In this context, for example, just one (single) laser device can suffice for connecting the cell stack to the contact elements. The laser device can be movable or can be moved, for example, relative to the chamber and/or the chamber can be movable or can be moved relative to the laser device. For example, a rotary device can rotate the chamber relative to the laser device. The rotary device can rotate the chamber and the laser device relative to each other, so that the laser device is positioned in a final position of the rotational movement above one of the laser beam entry windows and in another final position of the rotational movement above another one of the laser beam entry windows. This can contribute to a reduction of the system costs (by saving one laser).

According to another advantageous embodiment, it is being proposed that at least one protective device is used in order to protect the surroundings from the at least one laser beam. The protective device can be, for instance, a laser protective chamber and/or a local encapsulation. The laser protective chamber is especially made up of a housing that preferably completely surrounds the chamber and/or the laser device(s). The local encapsulation can be configured and arranged so as to locally surround or shield the path of the laser beam from the laser device all the way to the chamber. The number of local encapsulations can match the number of laser devices and/or the number of laser beam entry windows. The encapsulation can, for example, be moved by means of the laser device towards the chamber and away from it again. A sensory device can be provided that detects whether the encapsulation is present and does not activate the laser until the encapsulation has been detected.

A chamber can be provided that is loaded with a component repeatedly or over and over again. In this context, the chamber can be (permanently) associated with at least one laser device and/or it can be (permanently) integrated into an arrangement with at least one laser device, or it can always remain there. As an alternative, several chambers can be provided that are each loaded with a component and that are arranged consecutively in a certain relationship to at least one laser device for purposes of connecting the cell stack to the at least one contact element.

According to another aspect, a component for storing electrical energy, said component comprising at least one cell stack for storing electrical energy and at least one contact element for making electrical contact with the at least one cell stack, is being proposed, wherein the at least one cell stack and the at least one contact element are connected to each other by means of a laser-welded connection under reduced ambient pressure so as to be electrically conductive. Advantageous properties of the welded connection thus created include especially a reduced number and/or size of pores and/or a finer scaling and/or a finer formation of the keyhole or vapor capillary (in comparison to a welded connection under ambient pressure). Another advantage of the welded connection thus created can be seen in the uniformity of the process, which can advantageously contribute to a maximally homogeneous formation of the keyhole or vapor capillary.

According to another aspect, a device for producing a component for storing electrical energy, said component comprising at least one cell stack for storing electrical energy and at least one contact element for making electrical contact with the at least one cell stack, is being proposed, said device comprising:
  a chamber that can be evacuated,
  at least one evacuation device which can be connected to the chamber and by means of which at least some of the gas in the chamber can be evacuated,
  at least one holding device by means of which at least part of the at least one cell stack and the at least one contact element can be held in a defined arrangement relative to one another in or against the chamber,
  at least one laser device by means of which at least one laser beam for connecting the at least one cell stack and the at least one contact element to each other can be introduced into the chamber in order to create an electrically conductive connection.

The device can be provided and configured, for example, to carry out a method described here and/or to produce a component described here. The evacuation device can comprise at least one vacuum connection or negative-pressure connection of the chamber and/or at least one vacuum pump. The holding device can comprise at least one receptacle for the at least one cell stack or for a product carrier that carries the at least one cell stack. Moreover, the holding device can comprise at least one support for the at least one contact element. The laser device can comprise at least one laser source, especially an infrared laser source.

The details, features and advantageous embodiments elucidated in conjunction with the method can accordingly also be present in the component being presented here and/or in the device and vice versa. Hence, the explanations given there for more in-depth characterization of the features are hereby referenced to the full scope.

BRIEF DESCRIPTION OF THE DRAWINGS

The solution presented here as well as its technical field will be explained in greater detail below with reference to the figures. It should be pointed out that the invention is not to be restricted by the embodiments presented. In particular, unless not explicitly indicated otherwise, it is also possible for partial aspects of the facts elaborated upon in the figures or in conjunction with the figures to be extracted and to be combined with other constituents and/or insights stemming from other figures and/or from the present description. The following is shown schematically.

DETAILED DESCRIPTION OF THE INVENTION

Figure 1:
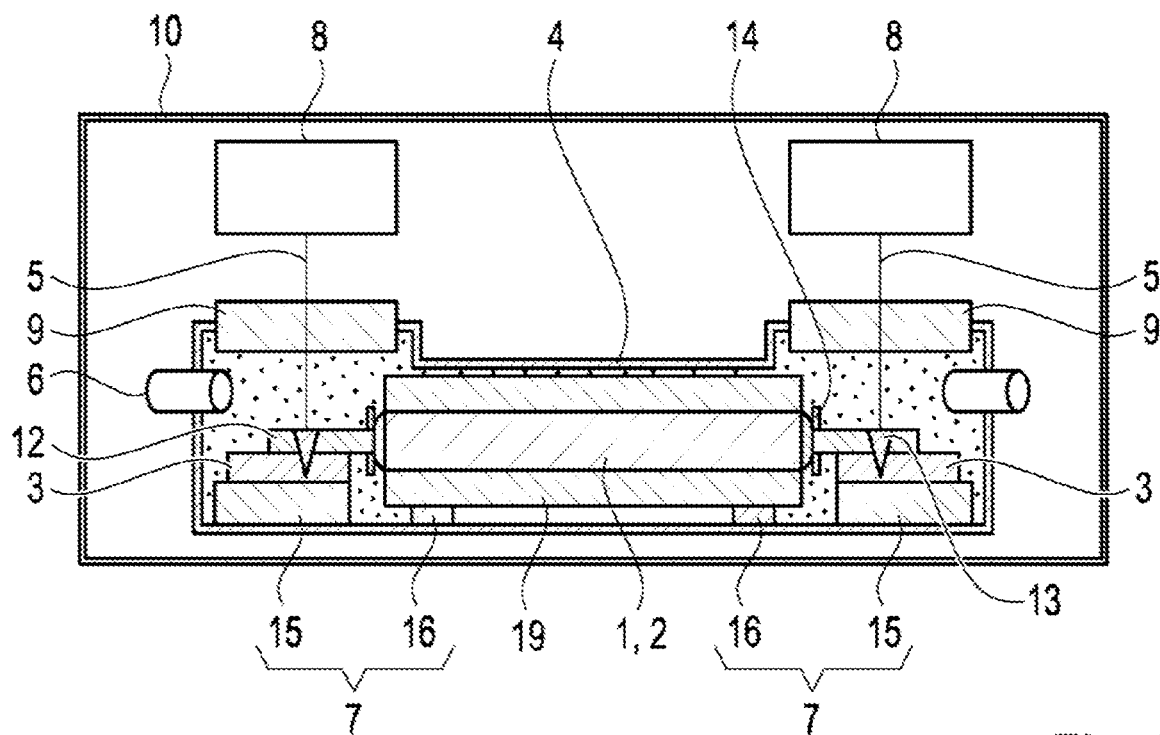
FIG. 1 an example of a device described here for producing a component, in a sectional view from the side, FIG. 2 the device from FIG. 1, in a top view, FIG. 3 the device from FIG. 1, in a sectional view from the top, FIG. 4 another example of a device described here for producing a component, in a sectional view from the side, FIG. 5 another example of a device described here for producing a component, in a sectional view from the side, FIG. 6 an illustration of a possible work step of the device shown in FIG. 5, FIG. 7 another example of a device described here for producing a component, in a sectional view from the side and in a sectional view from the top, and FIG. 8 another example of a device described here for producing a component, in a sectional view from the side and in a sectional view from the top.

FIG. 1 schematically shows an example of a device described here for producing a component 1 in a sectional view from the side. The component 1 serves to store electrical energy and here, by way of example, it comprises a cell stack 2 for storing electrical energy and two contact elements 3 for making electrical contact with the cell stack 2. The cell stack 2 and the contact elements 3 are each electrically conductively connected to each other by means of a laser-welded connection or laser weld seam 13 under reduced ambient pressure.

The device for producing the component 1 comprises a chamber 4 that can be evacuated, at least one evacuation device (indicated here by the two negative pressure connections 6) which can be connected to the chamber 4 and by means of which at least some of the gas in the chamber 4 can be evacuated, at least one holding device 7 by means of which at least part of the at least one cell stack 2—which is in turn provided in a product carrier 19—and the at least one contact element 3 can be held in a defined arrangement relative to one another in or against the chamber 4, at least one laser device 8 by means of which at least one laser beam 5 for connecting the at least one cell stack 2 and the at least one contact element 3 to each other can be introduced into the chamber 4 in order to create an electrically conductive connection. In the product carrier 19, the cell stack 2 can be transported into and out of the stacking process in order to be welded and, if applicable, it can be transferred to the further process steps.

In the example shown in FIG. 1, the device is especially a welding device into which a lithium-ion cell stack 2—including the stack carrier and the contact element 3 (arrester) that is to be welded on—is placed in order to form the stack. Inside this device, welding operations can be carried out under reduced atmospheric pressure or in a vacuum in order to contact the arresters with the stack.

Here, by way of example, the at least one cell stack 2 is a cell stack for a lithium-ion cell. The cell stack comprises two sides that are opposite from each other (differently polarized electrode) lugs 13 [sic] that project from the cell stack 2 so that the cell stack 2 can be electrically connected. The cell stack 2 is connected to the contact elements 3 in the area of the lugs 13 [sic]. For this purpose, in each case, a contact element 3 can be held above or below the lugs 13 on one side and connected to the lugs in this relative arrangement. In FIG. 1, by way of example, the appertaining electrically conductive connection is indicated by the weld seams 13. The contact elements 3 serve to electrically connect the cell stack 2, for example, to an electric circuit. In FIG. 1, it is also shown by way of example that the lugs 12 of each side can be provided with a lug tensioner 14.

As a rule, the evacuation device 6 (in addition to the negative-pressure connections 6) comprises at least one vacuum pump (not shown here), that can be connected to the space in the chamber via the negative-pressure connections 6. So as to achieve the positioning of the cell stack 2 and the contact element 3 relative to each other, the holding device 7—here by way of example—has two supports 15 (the so-called arrester support device) for arranging the contact elements 3 in a defined position and a receptacle 16 (the so-called stack carrier receptacle) for arranging the cell stack 2 (which is held in the product carrier 19) in a defined position. Fundamentally, the cell stack 2 and the contact elements 3 (arresters) can be put in place together or separately. In order to arrange the contact elements 3 together in the chamber 4 and/or on the holding device 7, they can already be affixed to the cell stack 2. Here, the cell stack 2 (including the lugs 12) and the contact elements 3 can be placed together into the device. The holding device 7 can especially be configured in such a way that the parts that are to be joined (lugs 12 and contact elements 3) are arranged relative to the laser beam 5 in such a way that the laser beam 5 first strikes (either) the contact element 3 (arrester) or a lug 12, or else it is coupled into the component 1.

Here, the chamber 4 is formed, for instance, to be component dimension-specific. By way of example, the chamber 4 is in the form of a negative pressure/vacuum laser chamber that is only slightly larger than the volume of the component 1—including the cell stack 2 and the contact elements 3 (arresters)—of the product carrier 19 and of the holding device 7 (especially of the support device of the arrester). A correspondingly small volume can be achieved in that the chamber 4 is adapted to a certain type of cell stack 2 or to a certain cell stack size and does not have to be suitable for a large number of different cell stacks. As a result, the evacuation time of the laser chamber is kept as small as possible since it minimizes the "dead space" that also has to be evacuated. This advantageously saves production time in the cell manufacturing process. Moreover, the process costs can advantageously be reduced thanks to the consequently reduced cycle times for establishing the negative pressure.

In each case here, the at least one laser beam 5 is an infrared laser beam. In FIG. 1, for example, two laser devices 8 are provided which can optionally also be referred to as so-called laser lenses (or "scanners"). Each of the two laser beams 5 can enter the chamber 4 through one of the, for example, two laser beam entry windows 9. In order for the laser beams 5 to be able to radiate into the chamber 4 in a targeted manner, the laser beam entry windows 9 in that area are advantageously inserted into a chamber wall (or into a chamber cover) where the welding operations are to be carried out.

As an example of a protective device 10 for protecting the surroundings from the at least one laser beam 5, a protective device 10 in the form of a laser protective chamber is used in the device presented by way of example in FIG. 1. This laser protective chamber encapsulates, for example, the (entire) chamber 4 and, if applicable, also the laser devices 8.

Using the device shown in FIG. 1 by way of example, the two laser devices 8 make it possible to connect two contact elements 3 to a cell stack 2 by means of laser beams 5 that, at least at times, function in parallel or simultaneously. In this manner, the two weld seams 13 can be made at the same time. As a result, this can advantageously save production time in the cell manufacturing process. However, the second laser device 8 can give rise to higher system costs. This can also be described in other words, namely, that the radiation of the laser for the welding operation can be emitted on the anode side and on the cathode side simultaneously by two lasers.

Figure 2:
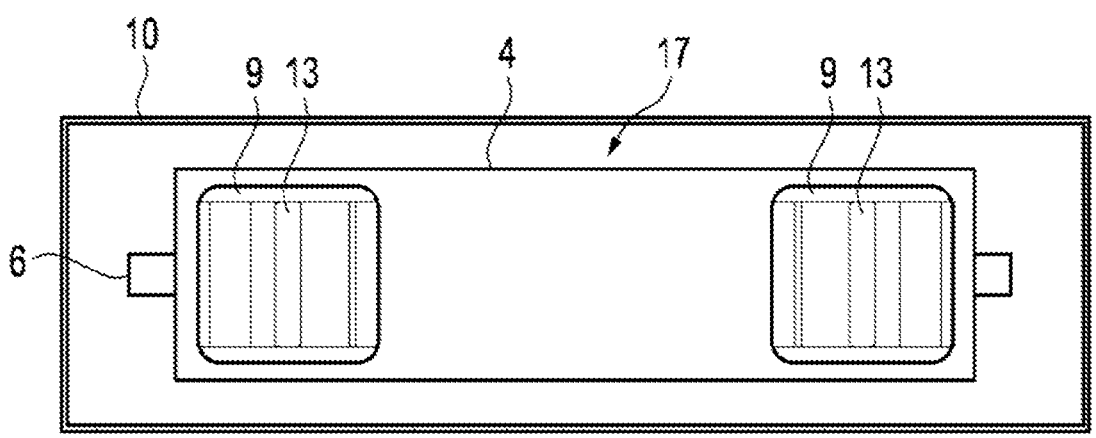

FIG. 2 schematically shows the device from FIG. 1 in a top view. In the top view, it can be seen that the weld seams 13 are formed below the laser beam entry windows 9. Moreover, this figure illustrates that the chamber 4 can be formed towards the top by a cover 17 or can be delimited by such a cover 17.

Figure 3:
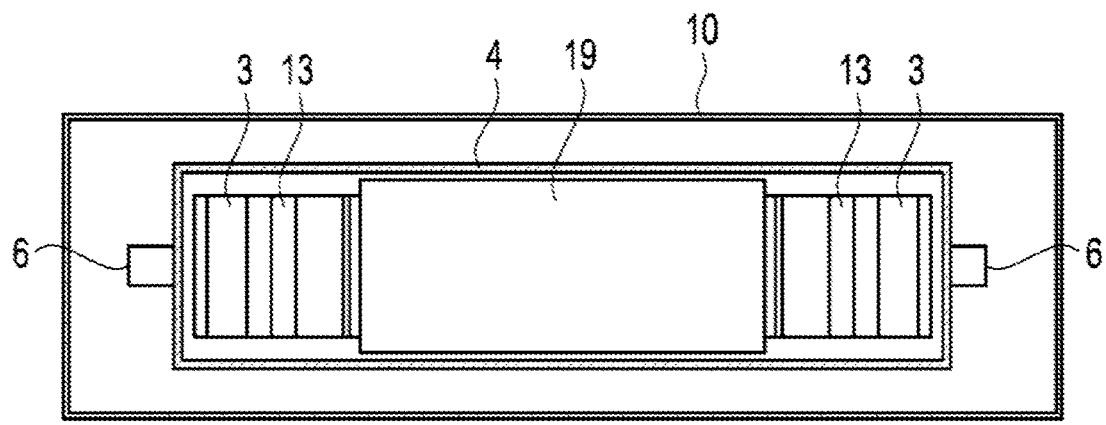

FIG. 3 schematically shows the device from FIG. 1 in a sectional view from the top. Here, the cover 17 has been removed. Thus, the view of the entire component 1 from the top is completely unobstructed.

Figure 4:
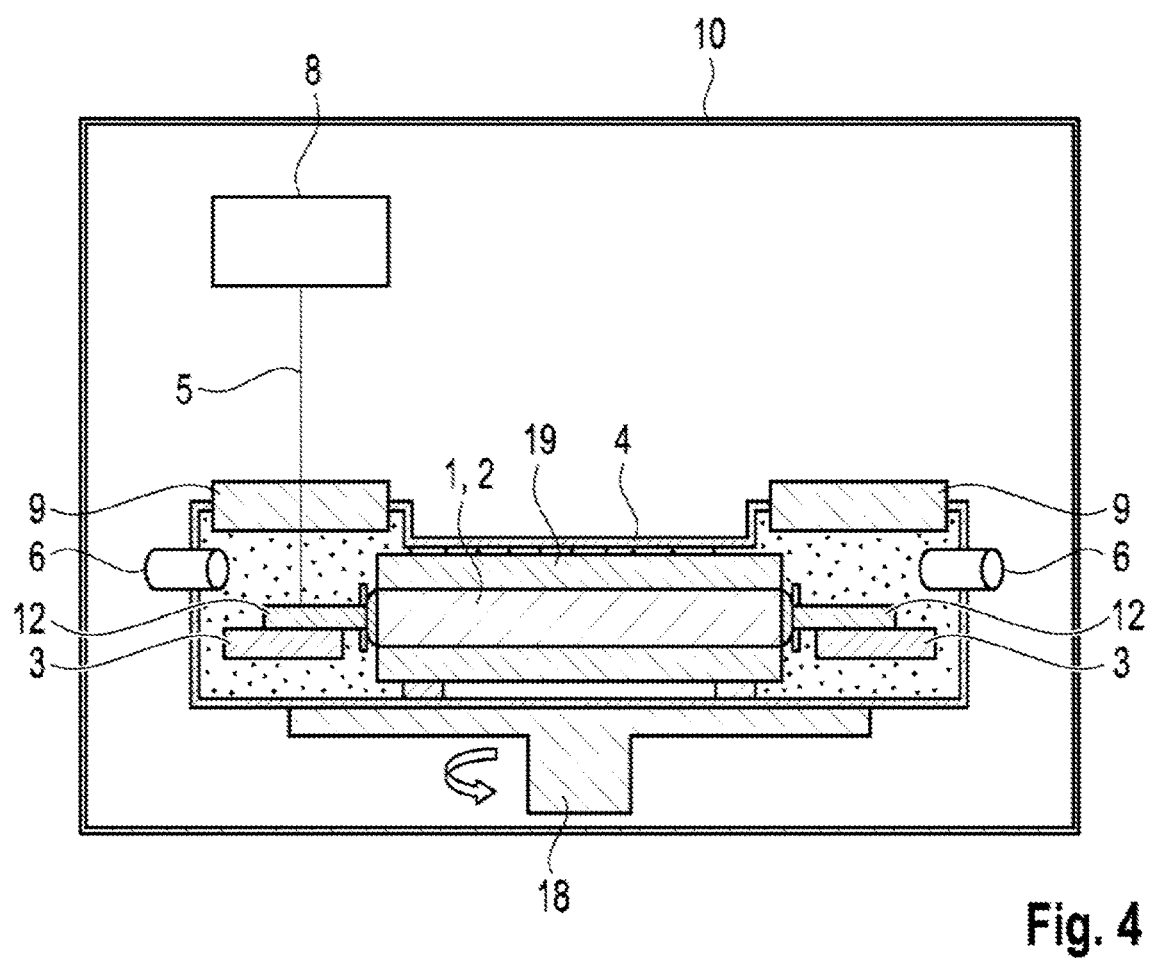

FIG. 4 schematically shows another example of a device described here for producing a component 1 in a sectional view from the side. The reference numerals are employed uniformly, so that below, primarily the differences from the examples of FIGS. 1 to 3 will be discussed.

The device according to FIG. 4 has only one laser device 8. In this context, the two contact elements 3 are connected to a cell stack 2, for example, by means of laser beams 5 that function consecutively in time. For this purpose, according to the example shown in FIG. 4, a rotary device 18 is provided by means of which the chamber 4 and the laser device 8 can be rotated relative to each other so that the laser device 8 is positioned in a final position of the rotational movement above one of the laser beam entry windows 9 and in another final position of the rotational movement above another one of the laser beam entry windows 9. This can also be described in other words, namely, that the radiation of the laser for the welding operation can be emitted on the anode side and on the cathode side by using a turntable to put the side that is to be welded into the proper position.

Figure 5:
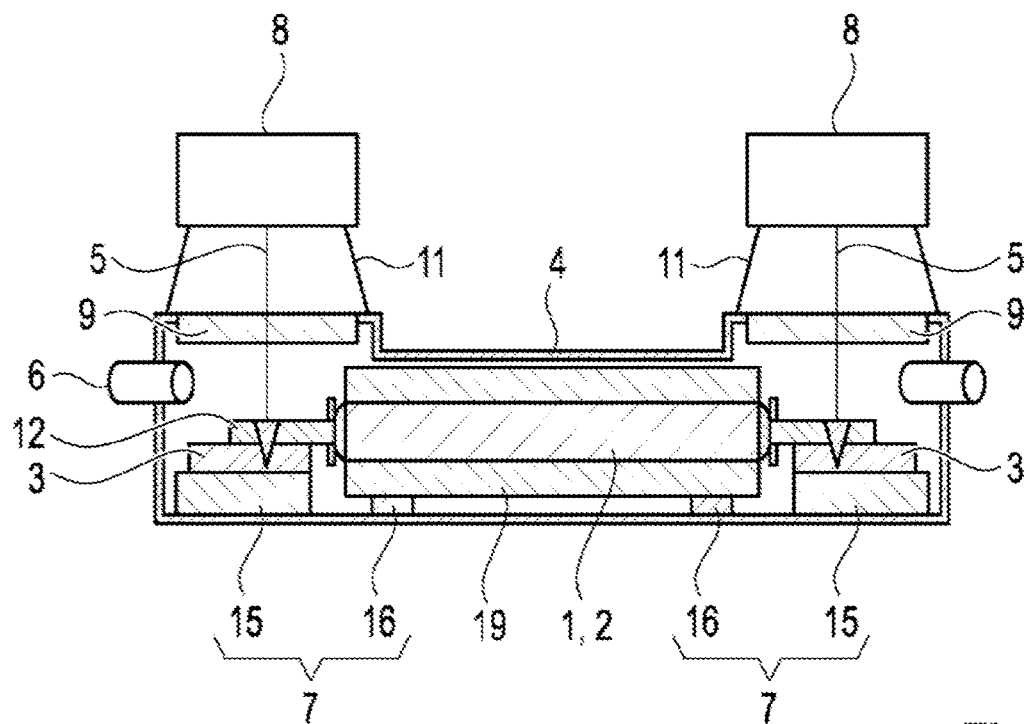

FIG. 5 schematically shows another example of a device described here for producing a component 1 in a sectional view from the side. The reference numerals are employed uniformly, so that below, primarily the differences from the examples of FIGS. 1 to 3 will be discussed. Moreover, the principle of rotating the component shown in FIG. 4 can also be advantageously combined with the principle of encapsulation shown in FIG. 5.

In FIG. 5 (instead of the laser protective chamber), a protective device 11 is used that is in the form of local encapsulations that are arranged between the laser devices 8 and the laser beam entry windows 9.

The objective of the protective device 11 is to locally encapsulate the free space that usually remains between the laser device 8 and the (negative-pressure/vacuum) chamber 4. For safety reasons, the free space is encapsulated especially in order to control or contain the free laser radiation. If the entire unit consisting of the laser device 8 and the chamber 4 cannot or is not supposed to be enclosed in a housing (in this context see the protective device 10 in FIGS. 1 to 4), then the free space between the laser device 8 and the chamber 4 can be closed off, for example, with the protective device 11 in the form of local encapsulations. This closure mechanism will be referred to below as "encapsulation".

Figure 6:
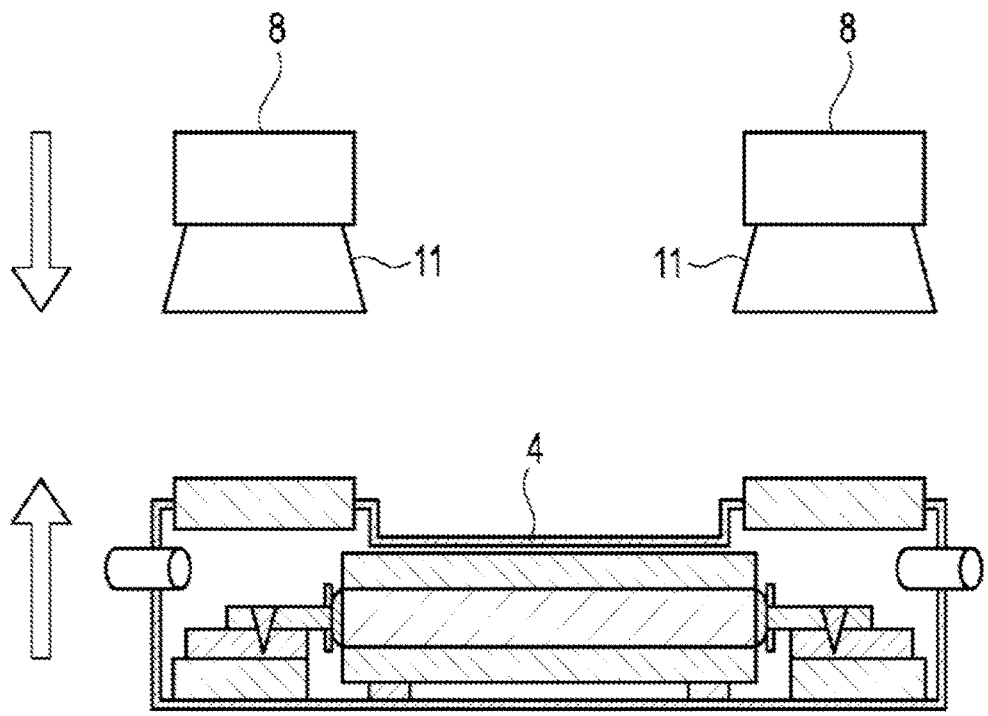

FIG. 6 schematically shows an illustration of a possible work step of the device from FIG. 5. As a rule, the openings of the encapsulation (protective device 11) are not permanently connected to the laser device 8 and/or to the chamber 4, so that the safety of the laser is achieved by placing the encapsulation onto the laser device 8 and/or onto the chamber 4. In this context, FIG. 6 illustrates a possible positioning movement after the encapsulation has been placed onto the appertaining laser device 8. Here, the positioning movements of the laser devices 8 can take place together or separately.

Figure 7:
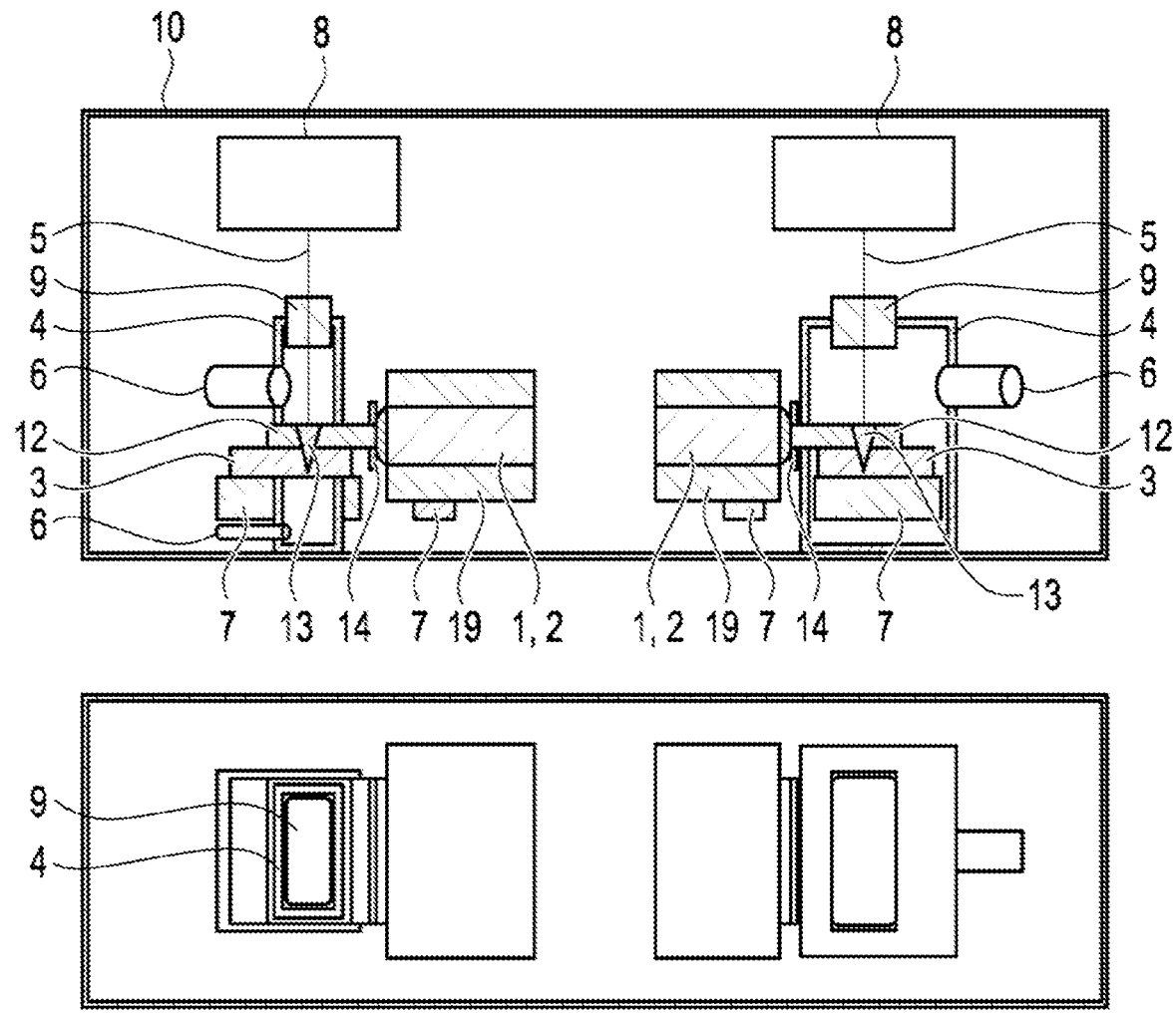

FIG. 7 schematically shows another example of a device described here for producing a component in a sectional view from the side (upper depiction in FIG. 7) and in a sectional view from the top (lower depiction in FIG. 7). The reference numerals are employed uniformly, so that below, primarily the differences from the examples of the preceding figures will be discussed. By way of example, FIG. 7 illustrates that it can be sufficient if (only) part of the at least one cell stack 2 and the at least one contact element 3 are arranged in the chamber 4 in a defined arrangement relative to each other. Here, as a rule, the area of the chamber 4 in which the connection is to be made is enclosed. In this context, the left-hand side and the right-hand side of FIG. 7 show various possibilities for implementing the example.

Figure 8:
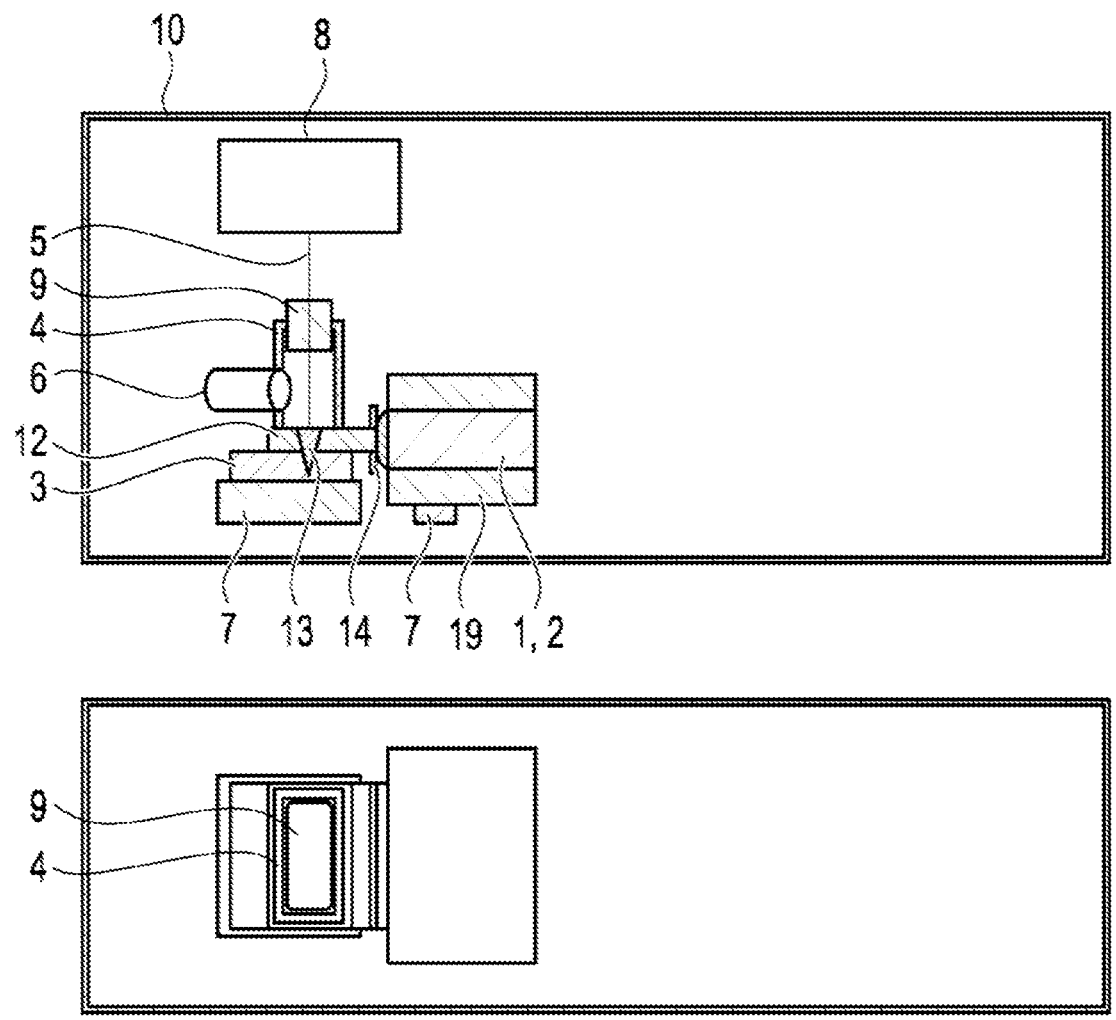

FIG. 8 schematically shows another example of a device described here for producing a component in a sectional view from the side (upper depiction in FIG. 8) and in a sectional view from the top (lower depiction in FIG. 8). The reference numerals are employed uniformly, so that below, primarily the differences from the examples of the preceding figures will be discussed. By way of example, FIG. 8 shows that at least part of the at least one cell stack 2 and the at least one contact element 3 can be arranged in the chamber 4 in a defined arrangement relative to each other. Here, the cell stack 2 and the at least one contact element 3, for example, form a kind of bottom of the chamber 4, whereby, if applicable, as shown in FIG. 8, it can be sufficient if the element (cell stack or contact element) which is struck first by the laser 5 is in direct contact with the remaining part of the chamber which is configured, for example, like a bell.

Furthermore, different concepts for the use of the chamber 4 are possible (for example, in the form of a product carrier). Thus, for example, the chamber can be permanently positioned in a laser system and can be loaded with components 1 repeatedly (or over and over again). An advantage of this concept is that the set-up process only has to be carried out once. As an alternative, several chambers 4 per laser system can be used. For example, several chambers 4 can be used in a recirculation mode. Here, the loading of the chamber with the component 1 can take place outside of the laser system. Moreover, the chamber 4 can be closed and/or evacuated outside of the laser system. As a result, processing time in the laser system is advantageously saved.

Consequently, a method for producing a component, as well as a component and a device for producing a component can be put forward, all of which at least partially solve the problems described in conjunction with the state of the art. In particular, a method for producing a component, as well as a component and a device for producing a component are put forward, all of which can especially at least contribute to saving time and/or costs during the production of (lithium-ion) batteries.

LIST OF REFERENCE NUMERALS

1 component
2 cell stack
3 contact element
4 chamber
5 laser beam
6 evacuation device
7 holding device
8 laser device
9 laser beam entry window
10 protective device
11 protective device
12 lug
13 weld seam
14 lug tensioner
15 support
16 receptacle
17 cover
18 rotary device
19 product carrier

The invention claimed is:

1. A method for producing a component for storing electrical energy, said component comprising at least one cell stack for storing electrical energy and at least one contact element for making electrical contact with the at least one cell stack, the method comprising the following steps:
   a) arranging at least part of the at least one cell stack and the at least one contact element in a defined arrangement relative to one another in or against a chamber that can be evacuated, wherein the chamber is arranged like a bell over an area in which the connection between the at least one cell stack and the at least one contact element is to be made, wherein at least part of the at least one cell stack or of the at least one contact element form one of the chamber walls;
   b) evacuating at least some gas in the chamber; and
   c) connecting the at least one cell stack and the at least one contact element together to form an electrically conductive connection by means of a laser beam introduced into the chamber.

2. The method according to claim 1, wherein the at least one cell stack is a cell stack for a lithium-ion cell.

3. The method according to claim 1, wherein the chamber is configured to be dimension-specific for a given component.

4. The method according to claim 1, wherein the at least one laser beam is an infrared laser beam.

5. The method according to claim 1, wherein the at least one laser beam enters the chamber through the at least one laser beam entry window.

6. A method for producing a component for storing electrical energy, said component comprising at least one cell stack for storing electrical energy and at least one contact element for making electrical contact with the at least one cell stack, wherein at least two contact elements are connected to a cell stack by means of laser beams that, at least at times, are functioning in parallel or simultaneously or by means of laser beams that function consecutively in time, the method comprising the following steps:
   a) arranging at least part of the at least one cell stack and the at least one contact element in a defined arrangement relative to one another in or against a chamber that can be evacuated;
   b) evacuating at least some gas in the chamber; and
   c) connecting the at least one cell stack and the at least one contact element together to form an electrically conductive connection by means of a laser beam introduced into the chamber.

7. The method according to claim 1, wherein at least one protective device is used in order to protect the surroundings from the at least one laser beam.

8. A device for producing a component for storing electrical energy, said component comprising at least one cell stack for storing electrical energy and at least one contact element for making electrical contact with the at least one cell stack, said device comprising:
   a chamber that can be evacuated,
   at least one evacuation device which can be connected to the chamber and by means of which at least some gas in the chamber can be evacuated,
   at least one holding device by means of which at least part of the at least one cell stack and the at least one contact element can be held in a defined arrangement relative to one another in or against the chamber, wherein the chamber is arranged like a bell over an area in which the connection between the at least one cell stack and the at least one contact element is to be made, wherein at least part of the at least one cell stack or of the at least one contact element form one of the chamber walls, and
   at least one laser device by means of which at least one laser beam for connecting the at least one cell stack and the at least one contact element to each other can be introduced into the chamber in order to create an electrically conductive connection.

* * * * *